United States Patent [19]

Gavaletz

[11] Patent Number: 4,629,921

[45] Date of Patent: Dec. 16, 1986

[54] DYNAMOELECTRIC MACHINE ROTOR

[76] Inventor: John S. Gavaletz, 86 Hermann Ave., Carteret, N.J. 07008

[21] Appl. No.: 734,881

[22] Filed: May 16, 1985

Related U.S. Application Data

[63] Continuation-in-part of Ser. No. 418,227, Sep. 14, 1982, abandoned.

[51] Int. Cl.⁴ .............................................. H02K 21/12
[52] U.S. Cl. .................................... 310/156; 310/261
[58] Field of Search ................. 310/156, 74, 152, 154, 310/261

[56] References Cited

U.S. PATENT DOCUMENTS 3,840,763 10/1974 Baumann et al. ................... 310/156
4,405,873 9/1983 Noudahl ............................. 310/156
4,476,408 10/1984 Honsinger ........................... 310/156
4,510,680 4/1985 Miller et al. .................... 310/156 X

*Primary Examiner*—Donovan F. Duggan
*Attorney, Agent, or Firm*—Hedman, Gibson, Costigan & Hoare

[57] ABSTRACT

A rotor for a dynamoelectric machine is disclosed comprising a flywheel having a plurality of permanent magnets, distributed around the core and in the plane of the flywheel, which are aligned such that the N-poles are directed toward the outer perimeter of the flywheel. An even number of the magnets is provided, and the magnets are aligned so that the longitudinal axis of each magnet is at a 45° angle to the diameter of the flywheel which includes the exact center of the magnet.

3 Claims, 3 Drawing Figures

DYNAMOELECTRIC MACHINE ROTOR

This application is a continuation-in-part of U.S. application Ser. No. 418,227, filed Sept. 14, 1982, now abandoned.

The present invention relates to high-energy dynamoelectric machines.

BACKGROUND OF THE INVENTION

Dynamoelectric machines utilizing permanent magnets to build up the magnetic field of rotors are known. Permanent magnets have been mounted in slots in the rotor of a synchronous motor or in the limb of the rotor. See, e.g., U.S. Pat. No. 3,840,763 to Baumann et al and U.S. Pat. No. 3,881,243 to Bannon (both incorporated herein by reference). Housing permanent magnets in a rotor can eliminate the need for exciting a field with direct current, however relatively large rotors may be required to utilize magnets of appropriate strength, and the magnets are subject to gradual demagnetization over time and more rapid demagnetization caused by forced reversals of the magnetic flux while the synchronous motor is in use.

While magnets can be protected against the demagnetizing field caused by alternating current, e.g., by providing leakage flux paths, however, such measures further increase the dimensions and weight of the machine, and add to its cost.

It has now been discovered that a rotor having a particular radial arrangement of permanent oriented ceramic magnets embedded or mounted in the plane of the rotor provides an improved magnetic field which does not reverse polarity or flux pattern of the magnets while rotating under demagnetizing conditions. Such magnetic rotors allow more efficient machine design, eliminate the necessity of constantly replacing magnets, conserve space within the dynamoelectric machine and reduce the cost associated with the rotor.

SUMMARY OF THE INVENTION

Accordingly, it is an object of the present invention to provide an efficient, low-cost magnetic rotor or flywheel for a dynamoelectric machine.

It is another object of the present invention to provide a magnetic rotor or flywheel having a plurality of magnets that will not change polarity while the rotor is in use.

In accordance with the present invention, there is provided a magnetic rotor or flywheel for a dynamoelectric machine. The rotor is made of any non-magnetic material and has a plurality of an even number of magnets mounted onto the rotor. The magnets are evenly spaced along the outer perimeter of the rotor having all the N-poles pointing out toward the outer perimeter and all the S-poles pointing inward. The magnets are generally bar magnets, flat and rectangular in shape and are aligned on the rotor such that the longitudinal axis of each magnet is at a 45° angle to the imaginary diameter of the rotor which passes through the centerpoint of the particular magnet.

By arranging the magnets in this particular angular relationship within the rotor plane, and providing perfect radial symmetry by employing an even number of magnets, the magnets surprisingly do not change polarity while rotating under demagnetizing conditions, thereby improving the rotor's magnetic field. Used, for instance, in a synchronous motor, the magnetic rotor of the invention will take less power from a generator to produce current than conventional rotors (i.e., the rotor will not be as much of a "drag" on a generator). Also, because the new magnetic rotors do not experience forced reversals in polarity, they will not have to be constantly replaced or serviced, thus improving the efficient life of the dynamoelectric machine they are used in.

DETAILED DESCRIPTION OF THE INVENTION

Figure 1:
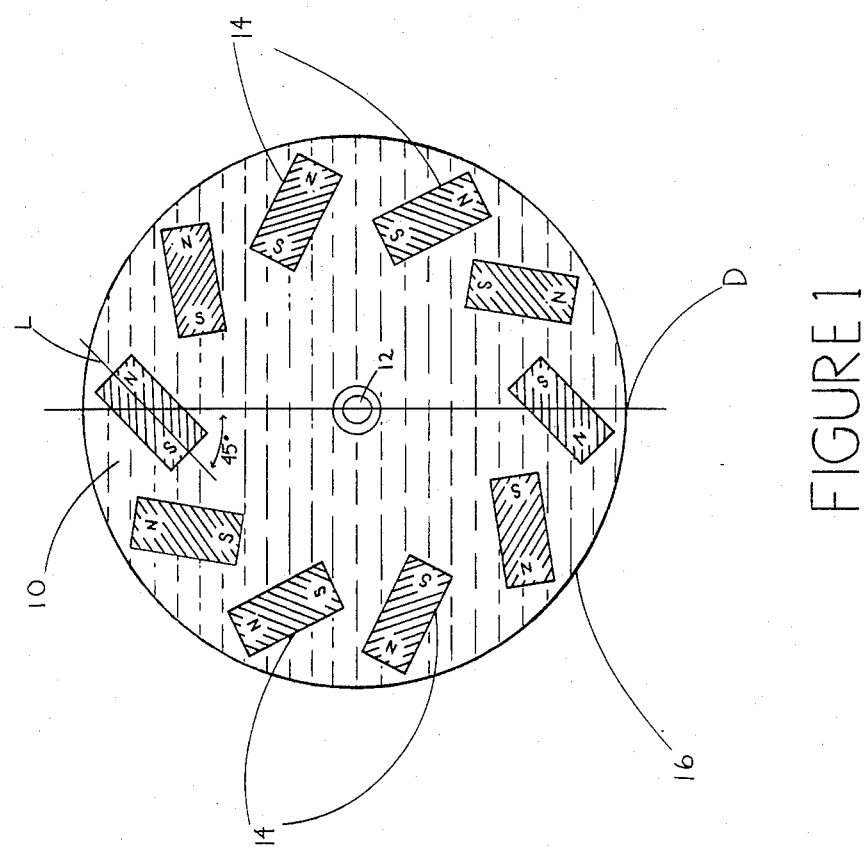
FIG. 1 is a plan view of the rotor of the present invention showing the unique placement of the magnets.

As shown in FIG. 1, the invention includes a rotor or flywheel 10 mounted on an axle 12. The rotor 10 and the axle 12 can be made of any non-magnetic material of sufficient durability to be able to firmly hold the magnets once they are fastened or inserted. In addition, the rotor 10 may be made of any diameter or thickness, depending on the particular dynamoelectric machine and purpose it is to be used for.

A plurality of magnets 14 are mounted on the rotor 10 adjacent the outer perimeter. The magnets 14 are oriented such that the N-poles are oriented toward the outer perimeter 16 of the rotor 10 and the S-poles are toward the center of the rotor 10. The magnets 14 are provided in an even number so as to provide perfect radial symmetry, or bilateral symmetry (mirror image symmetry), on either side of any diameter of the rotor.

The magnets 14 are generally rectangular in configuration and are aligned so that the longitudinal axis L of the magnets 14 is at a 45° angle to the diameter D of the rotor 10, where D passes through the exact center of the magnet 14.

The permanent magnets useful in constructing the magnetic rotor of this invention are bar magnets having a generally rectangular shape. They are preferably oriented (anisotropic) ceramic permanent magnets which produce a strong positive magnetic field. Suitable such magnets are commercially available, e.g., from Edmund. The magnets may be fastened to the rotor, e.g., with an epoxy glue, or, preferably, will be inlaid in the plane of the rotor to be flush with the surface.

The changing magnetic flux in a dynamoelectric machine can cause magnets to demagnetize while the rotor is rotating. In addition, the demagnetizing conditions can be created when applying field coils or pickup coils against the flywheel magnets.

EXAMPLE

A flywheel according to the invention is fabricated out of any non-magnetic material of sufficient strength, having 10 bar magnets inlaid into the plane of a wheel approximately ⅜ inch in width and approximately 9 inches in diameter, in the same configuration shown in FIG. 1. The flywheel is put into rotation by electric morot and field coils are applied at right angles to the plane of of the flywheel. No matter how powerful the coil or the number of field coils applied against the flywheel surface, the flux pattern of the magnets does not change while rotating.

By placing an even number magnets at 45° angles to the diameter around the rotor, it has been discovered, surprisingly, that the magnets do not change polarity while rotating under demagnetizing conditions. While several configurations of magnets for a rotor or flywheel have been proposed, e.g., in the aforementioned Baumann et al patent, none completely eliminates the problem of forced reversals of the magnetic flux. The discovery herein of a simple, symmetric configuration of magnets on a rotor that does not undergo changes in magnetic flux in use is an important advance in this art.

Since the flux pattern of the magnets does not change while rotating, the rotor of the present invention provides an improved magnetic field and in turn a more efficient dynamoelectric machine.

As will be apparent to persons skilled in the art, changes and modifications can be made herein without departing from the spirit of the present invention. All such changes and modifications will be included within the scope of the appended claims.

I claim:

1. A dynamoelectric machine rotor comprising:
   a circular flywheel comprised of non-magnetic material rotatable about a centrally located axle, and
   a plurality of magnets secured in the plane of said flywheel and oriented such that the N-pole of each magnet is directed outwardly toward the perimeter of the flywheel, the magnets being of even number and equally spaced radially around the entire circumference of the flywheel, each magnet further being oriented at a 45° angle to the diameter which passes through the exact center of the magnet.

2. The dynamoelectric machine rotor of claim 1, wherein the number of magnets is 10 or 12.

3. The dynamoelectric machine rotor of claim 1, wherein each of said magnets is rectangularly shaped and inlaid into the surface of the flywheel.

* * * * *